US012063504B2

United States Patent
Yang et al.

(10) Patent No.: US 12,063,504 B2
(45) Date of Patent: Aug. 13, 2024

(54) SYSTEMS AND METHODS FOR PROVIDING ACCESS TO A WIRELESS COMMUNICATION NETWORK BASED ON RADIO FREQUENCY RESPONSE INFORMATION AND CONTEXT INFORMATION

(71) Applicant: Verizon Patent and Licensing Inc., Basking Ridge, NJ (US)

(72) Inventors: Jin Yang, Orinda, CA (US); Krishna K. Bellamkonda, Flower Mound, TX (US); Greg Augustus Rusu, Somerset, NJ (US); Vijaya Paduvalli, Fremont, CA (US); Ahmed Moussa, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 321 days.

(21) Appl. No.: 17/457,114

(22) Filed: Dec. 1, 2021

(65) Prior Publication Data

US 2023/0112506 A1 Apr. 13, 2023

Related U.S. Application Data

(63) Continuation-in-part of application No. 17/450,389, filed on Oct. 8, 2021.

(51) Int. Cl.
*G06F 7/04* (2006.01)
*H04W 12/069* (2021.01)
(Continued)

(52) U.S. Cl.
CPC ......... *H04W 12/069* (2021.01); *H04W 12/08* (2013.01); *H04W 12/79* (2021.01)

(58) Field of Classification Search
CPC .... H04W 12/069; H04W 12/08; H04W 12/79
(Continued)

(56) References Cited

U.S. PATENT DOCUMENTS

| 2011/0263250 A1* | 10/2011 | Mueck | H04W 48/10 |
| | | | 455/434 |
| 2014/0351887 A1* | 11/2014 | Liu | H04W 12/06 |
| | | | 726/3 |

(Continued)

OTHER PUBLICATIONS

Zhenqxiong Li, et al.; "E-Eye: Hidden Electronics Recognition through mmWave Nonlinear Effects"; SenSys '18, Nov. 4-7, 2018; Shenzhen, China; pp. 68-81; 2018 Association for Computing Machinery; ACM ISBN 978-1-4503-5952-8/18/11; https://doi.org/10.1145/3274783.3274833.

(Continued)

*Primary Examiner* — Jeffrey C Pwu
*Assistant Examiner* — Samuel Ambaye

(57) ABSTRACT

A system receives, from a user equipment, a request for access to a wireless communication network and identifies, based on the request, baseline radio frequency (RF) response information associated with the user equipment. The system obtains dynamic RF response information associated with the user equipment and authenticates, based on the dynamic RF response information and the baseline RF response information, the user equipment. The system thereby grants the user equipment access to the wireless communication network and determines context information associated with the user equipment. The system generates, based on the baseline RF response information and the context information, user equipment profile information and sends, to a base station associated with the wireless communication network, the user equipment profile information to facilitate access to the wireless communication network by the user equipment.

20 Claims, 9 Drawing Sheets

(51) Int. Cl.
  *H04W 12/08* (2021.01)
  *H04W 12/79* (2021.01)
(58) Field of Classification Search
  USPC ............................................................. 726/2
  See application file for complete search history.

(56) References Cited

U.S. PATENT DOCUMENTS

| | | | |
|---|---|---|---|
| 2016/0234232 A1* | 8/2016 | Poder | H04L 63/1416 |
| 2018/0124601 A1* | 5/2018 | Vutukuri | H04W 48/14 |
| 2020/0195679 A1 | 6/2020 | Du | |

OTHER PUBLICATIONS

Trevor J. Bihl, et al.; "Feature Selection for RF Fingerprinting With Multiple Discriminant Analysis and Using ZigBee Device Emissions"; IEEE Transactions on Information Forensics and Security; Aug. 2016; pp. 1862-1874; vol. 11, No. 8; IEEE Xplore.

Jiabao Yu, et al.; "Radio Frequency Fingerprint Identification Based on Denoising Autoencoders"; 2019 International Conference on Wireless and Mobile Computing, Networking and Communications (WiMob); 6 pages; IEEE Xplore.

* cited by examiner

SYSTEMS AND METHODS FOR PROVIDING ACCESS TO A WIRELESS COMMUNICATION NETWORK BASED ON RADIO FREQUENCY RESPONSE INFORMATION AND CONTEXT INFORMATION

CROSS-REFERENCE TO RELATED APPLICATION

This Patent Application is a continuation-in-part of prior U.S. patent application Ser. No. 17/450,389, filed on Oct. 8, 2021, and entitled "SYSTEMS AND METHODS FOR AUTHENTICATION BASED ON DYNAMIC RADIO FREQUENCY RESPONSE INFORMATION." The disclosure of the prior Application is considered part of and is incorporated by reference into this Patent Application.

BACKGROUND

An electronic device that includes electronic components provides a radio frequency (RF) response when probed with a high frequency radio wave signal, such as millimeter wave (mmWave) signal. In some cases, the RF response can be used to identify the electronic device.

DETAILED DESCRIPTION OF EXAMPLE EMBODIMENTS

Figure 1A:
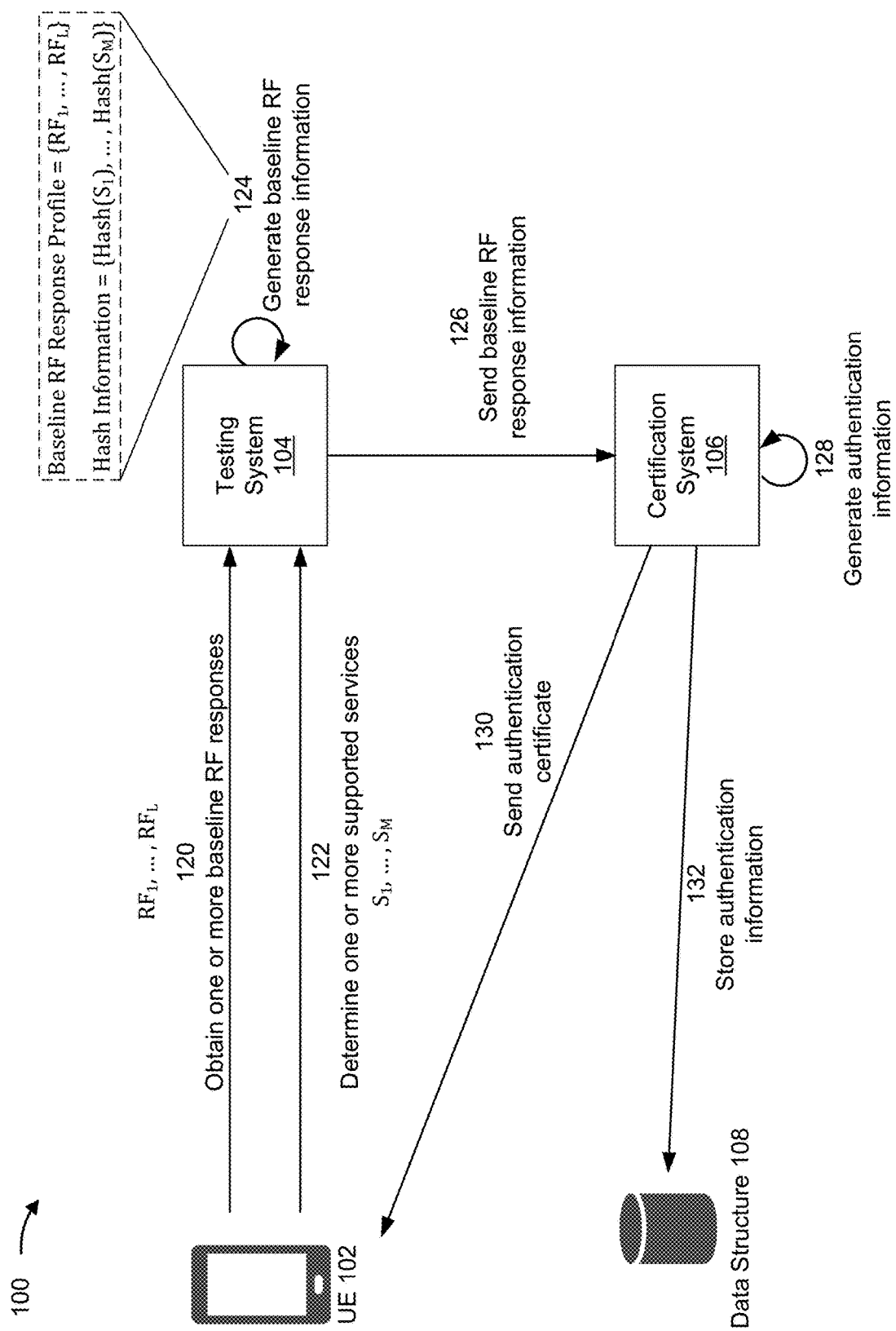
FIGS. 1A-1F are diagrams of an example associated with providing access to a wireless communication network based on radio frequency response information and context information.

The following detailed description of example implementations refers to the accompanying drawings. The same reference numbers in different drawings may identify the same or similar elements.

When a user equipment attempts to access a wireless communication network (e.g., a long-term evolution (LTE) network, a fourth generation (4G) network, a fifth generation (5G) network, or another type of next generation network) the user equipment undergoes an authentication process to authenticate the user equipment (e.g., verify that the user equipment has access to the wireless communication network). In a typical authentication process, the user equipment provides authentication credentials (e.g., a username and password, a token, or a certificate, among other examples) to an authenticating device to authenticate the user equipment. However, authentication credentials are often stolen, spoofed, or otherwise compromised, which allows a bad actor to impersonate the user equipment and/or gain access to the wireless communication network. Further, this impacts an ability of other user equipment to communicate via the wireless communication network (e.g., because an impersonated user equipment is using resources and/or services of the wireless communication network that would otherwise be available to the other user equipment). Additionally, in some cases, this causes resources of the other user equipment to be wasted or misapplied (e.g., based on interacting with the impersonated user equipment).

Some implementations described herein provide an authentication system that obtains baseline RF response information and dynamic RF response information associated with a user equipment that is requesting access to a wireless communication network. The dynamic RF response information includes data that indicates a respective RF response of the user equipment (e.g., to one or more communication transmission signals, such as one or more mmWave signals, transmitted by a base station of the wireless communication network) at one or more instants of time within a period of time (e.g., a previous hour). The authentication system compares the baseline RF response information and the dynamic RF response to generate comparison information. Accordingly, the authentication system grants the user equipment access to the wireless communication network when the authentication system determines that the comparison information indicates that there is no difference, or there are insignificant differences, between the baseline RF response information and the dynamic RF response.

Further, in some implementations, based on authenticating the user equipment, the authentication system determines context information associated with the user equipment (e.g., the authentication system performs a lookup in a data structure to determine one or more services of the wireless communication network that are available to the user equipment). The authentication system generates user equipment profile information (e.g., by hashing the context information based on the baseline radio frequency response information) and sends the user equipment profile information to the base station of the wireless communication network. The base station uses the user equipment profile to validate the user equipment (based on receiving updated RF response information associated with the user equipment) and to ensure that the one or more services of the wireless communication network are provided to the user equipment.

In this way, the authentication system authenticates the user equipment based on one or more dynamic RF responses of the user equipment. This removes a need for traditional authentication credentials to authenticate the user equipment. Additionally, it is difficult for a bad actor to provide an imitation or spoofed user equipment that includes the dynamic RF responses of the user equipment, which decreases a likelihood that an imitation or spoofed user equipment would be successfully authenticated by the authentication system. Accordingly, some implementations described herein reduce a likelihood that a bad actor can be granted access to the wireless communication network (e.g., as compared to securing access to the resource using a typical authentication process), which improves the security for the user equipment to access the wireless communication network. This improves a security of the wireless communication network, which allows other user equipment to effectively operate on the wireless communication network and/or minimizes waste or misapplication of resources of the other user equipment (e.g., by minimizing a likelihood that the other user equipment is interacting with a compromised user equipment).

FIGS. 1A-1F are diagrams of one or more examples 100 associated with providing access to a wireless communication network based on radio frequency response information and context information. As shown in FIGS. 1A-1F, example(s) 100 may include a user equipment (UE) 102, a testing system 104, a certification system 106, a data structure 108, a base station 110, and/or an authentication system 112, which are described in more detail in connection with FIG. 2. The UE 102, the base station 110, and authentication system 112 may be associated with a wireless communication network described herein.

As shown in FIG. 1A, the testing system 104 may determine one or more characteristics and/or capabilities of the UE 102. For example, the testing system 104 may be associated with a manufacturer of the UE 102 and may be configured to determine the one or more characteristics and/or capabilities of the UE 102 after manufacture and/or assembly of the UE 102 (e.g., prior to the UE 102 being acquired by a user of the UE 102). Accordingly, as shown by reference number 120, the testing system may obtain one or more baseline RF responses of the UE 102.

The one or more baseline RF responses (shown as $RF_1$ through $RF_L$ in FIG. 1A, where L>1) may be RF responses of the UE 102 in one or more different modes (e.g., in an unpowered mode, in an idle mode, a passive connected mode, and/or an active connected mode, among other examples), different physical conditions (e.g., in a cold environment, in a hot environment, in a clothing pocket, in a purse, and/or in a person's hand, among other examples), and/or other conditions. In some implementations, the testing system 104 may provide one or more communication transmission signals (e.g., high frequency radio wave signals) to the UE 102 (e.g., in a testing environment) and the UE 102, in response, may provide the one or more baseline RF responses to the testing system 104 (e.g., in a similar manner as further described herein in relation to FIG. 1E).

As shown by reference number 122, the testing system 104 may determine one or more supported services of the UE 102. For example, the testing system 104 may communicate with the UE 102 and/or otherwise interact with the UE 102 to determine the one or more supported services. The one or more supported services (shown as $S_1$ through $S_M$ in FIG. 1A, where M>1) may include a security capability service, a maximum bit rate service, a network slice service, and/or another service that is supported by the UE 102 (e.g., when the UE 102 is connected to a wireless communication network).

As shown by reference number 124, the testing system 104 may generate baseline RF response information (e.g., based on the one or more baseline RF responses and/or the one or more supported services of the UE 102). For example, the testing system 104 may generate a baseline RF response profile and/or hash information. The baseline RF response profile may indicate the one or more baseline RF responses of the user equipment. For example, the baseline RF profile may be a tuple that includes each of the one or more baseline RF responses. The hash information may include hash values that are respectively associated with the one or more supported services. For example, for each supported service of the one or more supported services, the testing system 104 may use a hashing technique (e.g., with some or all of the baseline RF response profile as a hash seed value) on information identifying the supported service to generate a hash value associated with the supported service. Accordingly, as shown in FIG. 1A, the testing system 104 may include the baseline RF response profile (shown as a tuple that includes baseline RF responses $RF_1$ through $RF_L$) and/or the hash information (shown as a tuple that includes $Hash(S_1)$ through $Hash(S_M)$) in the baseline RF response information.

In some implementations, as shown by reference number 126, the testing system 104 may send the baseline RF response information to the certification system 106. The certification system 106 may be associated with a certification authority for generating authentication certificates or for otherwise certifying information. As shown by reference number 128, the certification system may generate authentication information based on the RF response information. For example, the certification system may use a private key (e.g., a private encryption key) associated with the certification system to sign and/or encrypt the RF response information and thereby generate the authentication information.

In some implementations, as shown by reference number 130, the certification system 106 may send an authentication certificate that includes the authentication information to the UE 102 (e.g., directly, or indirectly, such as via the testing system 104). Additionally, or alternatively, as shown by reference number 132, the certification system 106 may store the authentication information in the data structure 108. For example, the certification system 106 may communicate with the data structure 108 to cause the data structure 108 to generate at least one entry associated with the UE 102 (e.g., at least one entry that is indexed by an identifier associated with the UE 102, such as a unique identifier (UID) of the UE 102) and cause the at least one entry to include the authentication information. In some implementations, the data structure 108 is a distributed ledger, such as a blockchain, or another type of data structure, such as a database, an electronic folder, and/or an electronic file.

Figure 1B:
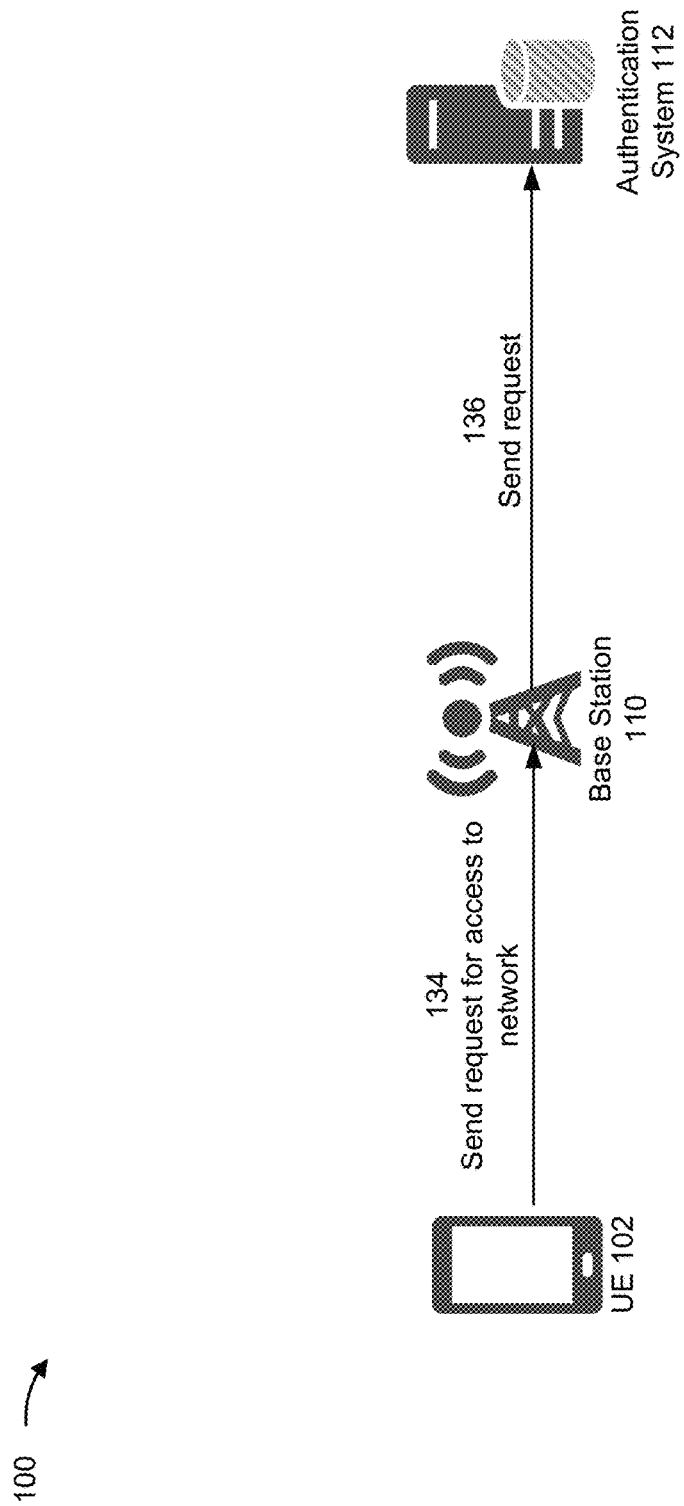

As shown in FIG. 1B, and by reference number 134, the UE 102 may send a request for access to a wireless communication network. For example, when the UE 102 is activated and is within a service range of the base station 110 (e.g., that is associated with the wireless communication network), the UE 102 may undergo a bootstrap process to connect to the wireless communication network. As part of the bootstrap process, the UE 102 may send the request to the base station 110. Accordingly, as shown by reference number 136, the base station 110 may send the request to the authentication system 112 (e.g., to allow the authentication system 112 to authenticate, or to not authenticate, the UE 102).

Figure 1C:
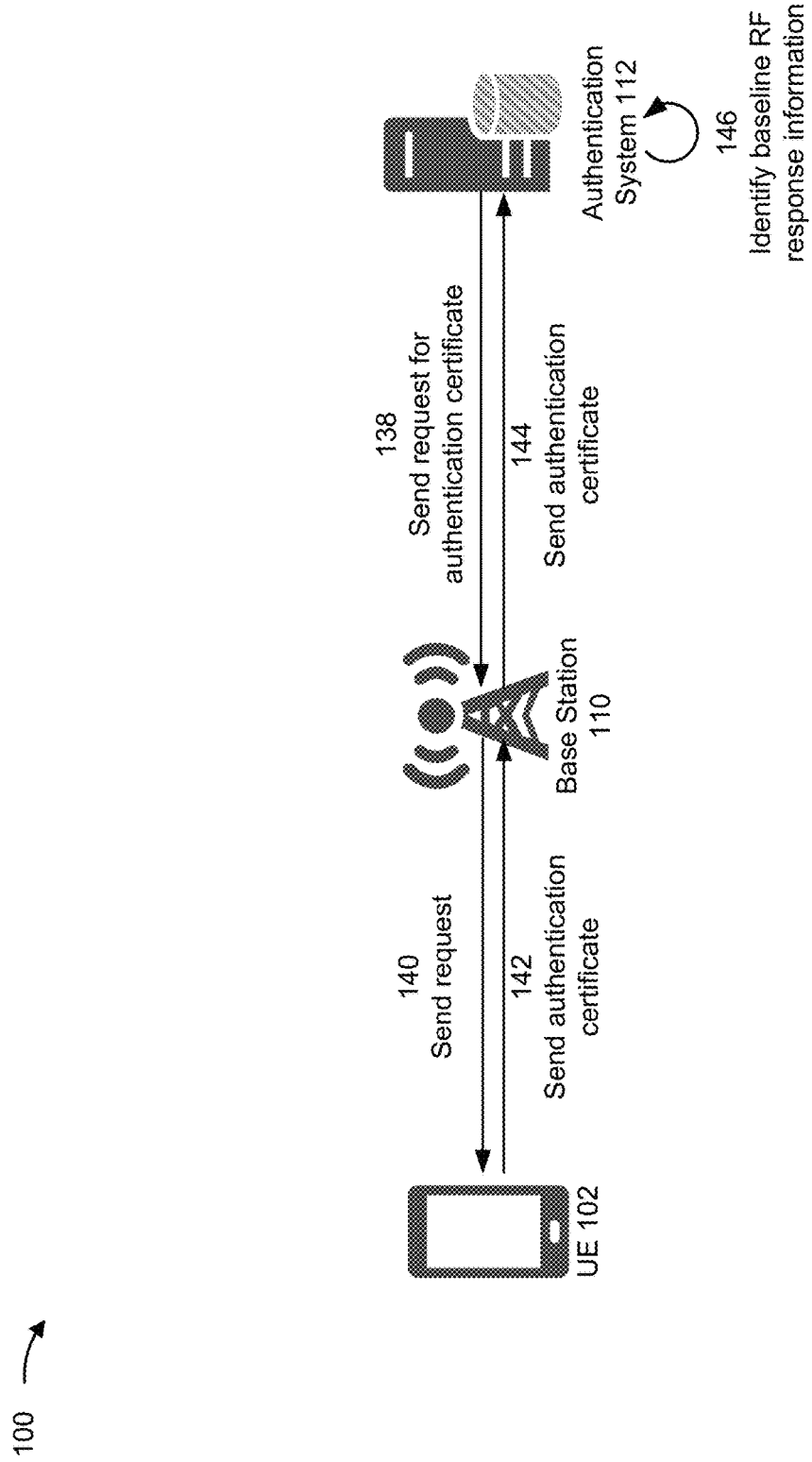
Figure 1D:
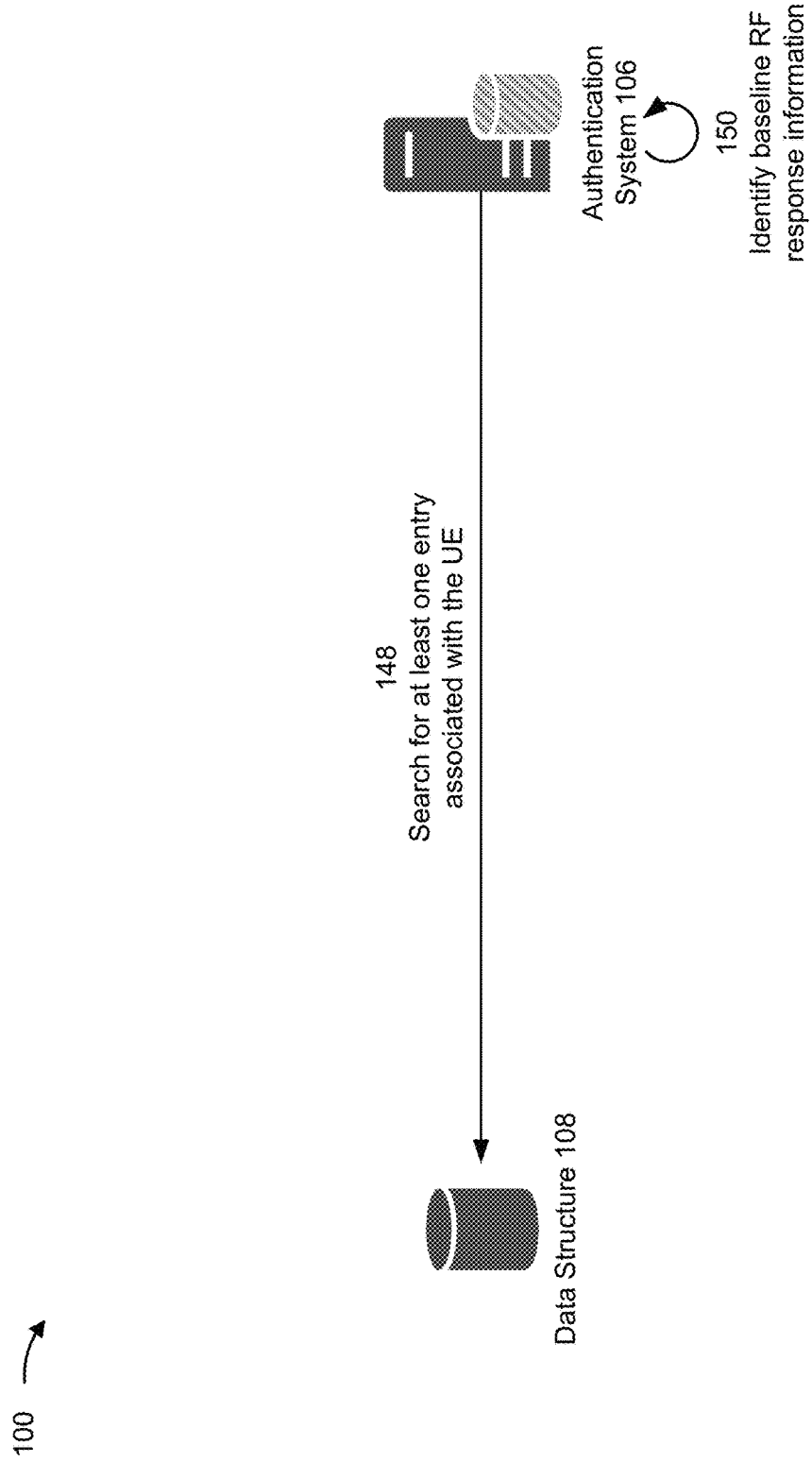

In some implementations, based on receiving the request, the authentication system 112 may perform one or more of the processing steps shown in FIG. 1C or, alternatively, one or more of the processing steps shown in FIG. 1D to identify the baseline RF response information associated with the UE 102 (e.g., that was generated by the testing system 104).

As shown in FIG. 1C, and by reference number 138, the authentication system 112 may send a request for an authentication certificate (e.g., that can be used to facilitate authentication of the UE 102 by the authentication system 112). For example, the authentication system 112, in response to the request for access to the wireless communication network sent by the UE 102, may send the request for the authentication certificate to the base station 110. Accordingly, as shown by reference number 140, the base station 110 may send the request for the authentication certificate to the UE 102. As shown by reference number 142, the UE 102, in response to the request for the authentication certificate, may send the authentication certificate (e.g., that was generated by the certification system 106) to the base station 110. Accordingly, as shown by reference number 144, the base station 110 may send the authentication certificate to the authentication system 112.

As shown by reference number 146, the authentication system 112 may process the authentication certificate to identify the baseline RF response information. For example, the authentication system 112 may process (e.g., parse) the authentication certificate to identify the authentication information included in the authentication certificate and may read the authentication information to identify the baseline RF response information. In some implementations, the authentication system 112 may authenticate the authentication certificate. For example, the authentication system 112 may use a public key (e.g., a public encryption key) associated with the certification system to decrypt the authentication information (e.g., to allow the authentication system 112 to read the authentication information that includes the baseline RF response information) and/or to validate the baseline RF response information (e.g., to validate that the RF response information is associated with the UE 102 and not another UE).

Alternatively, as shown in FIG. 1D, and by reference number 148, the authentication system 112 may search the data structure 108. For example, the authentication system 112 may process the request for access to the wireless communication network sent by the UE 102 to identify an identifier associated with the UE 102 (e.g., a UID that identifies the UE 102 as the originator of the request for access to the wireless communication network) that is included in the request. Accordingly, the authentication system 112 may search, based on the identifier, the data structure 108 to identify at least one entry associated with the UE 102 (e.g., that was stored in the data structure 108 by the certification system 106, as described herein in relation to FIG. 1A and reference number 132). As shown by reference number 150, the authentication system 112 may identify the baseline RF response information. For example, the authentication system 112 may process (e.g., parse or read) the at least one entry to obtain the baseline RF response information.

Figure 1E:
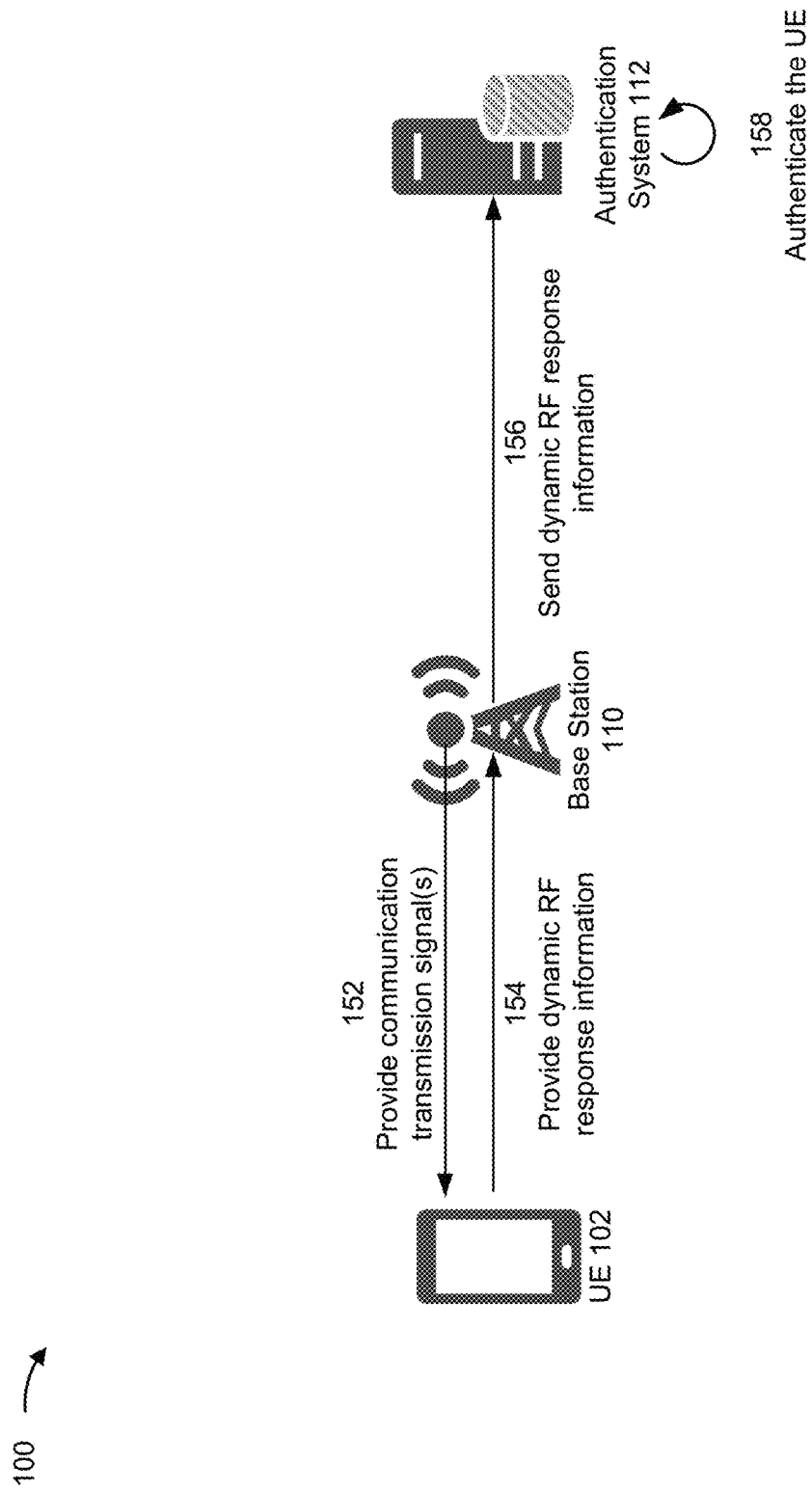

In some implementations, as shown in FIG. 1E, and by reference number 152, the base station 110 may provide one or more communication transmission signals to the UE 102. For example, the base station 110 may provide the one or more communication transmission signals to facilitate communication of the UE 102 (as well as other UEs) with the wireless communication network. Accordingly, the one or more communication transmission signals may be high frequency radio wave signals, such as mmWave signals. As shown by reference number 154, the UE 102 may provide dynamic RF response information associated with the UE 102 to the base station 110. For example, the UE 102 may automatically provide the dynamic RF response information to the base station 110 in response to the base station 110 providing the one or more communication transmission signals to the UE 102. The dynamic RF response information may include data that indicates a respective RF response of the UE 102 at one or more instants of time within a period of time (e.g., a period of time in which the UE 102 responds to the one or more communication transmission signals provided by the base station 110).

As shown by reference number 156, the base station 110 may send the dynamic RF response information to the authentication system 112. For example, the base station 110 may send the dynamic RF response information to the authentication system 112 as the base station 110 detects and/or receives the dynamic response information (e.g., in real-time or near real-time). As another example, the base station 110 may send the dynamic RF response information to the authentication system 112 on a scheduled basis (e.g., every 5 minutes, every hour, or every 12 hours), on an on-demand basis (e.g., based on a command received from the authentication system 112), on a triggered basis (e.g., after a particular amount of dynamic RF response information is received by the base station 110), and/or on an ad-hoc basis (e.g., to facilitate an authentication process, as described elsewhere herein).

As shown by reference number 158, the authentication system 112 may authenticate the UE 102 (e.g., based on the baseline RF response information and the dynamic RF response information). In some implementations, the authentication system 112 may process (e.g., parse or read) the baseline RF response information to identify the baseline RF response profile included in the baseline RF response information. Accordingly, the authentication system 112 may compare the baseline RF response profile and the dynamic RF response information to determine comparison information. The authentication system 112 may authenticate the UE 102 when the comparison information indicates that the baseline RF response profile and the dynamic RF response information match (e.g., corresponding RF responses indicated by the baseline RF response profile and the dynamic RF response information are the same or similar, within a tolerance). For example, when a particular baseline RF response indicated by the baseline RF response profile matches a particular RF response indicated by the dynamic RF response information, the authentication system 112 may authenticate the UE 102 (e.g., determine that the UE 102, and not another UE, sent the request for access to the wireless communication network). Alternatively, when a match does not exist between any of the one or more baseline RF responses indicated by the baseline RF response profile and any RF response indicated by the dynamic RF response information, the authentication system 112 may not authenticate the UE 102.

Figure 1F:
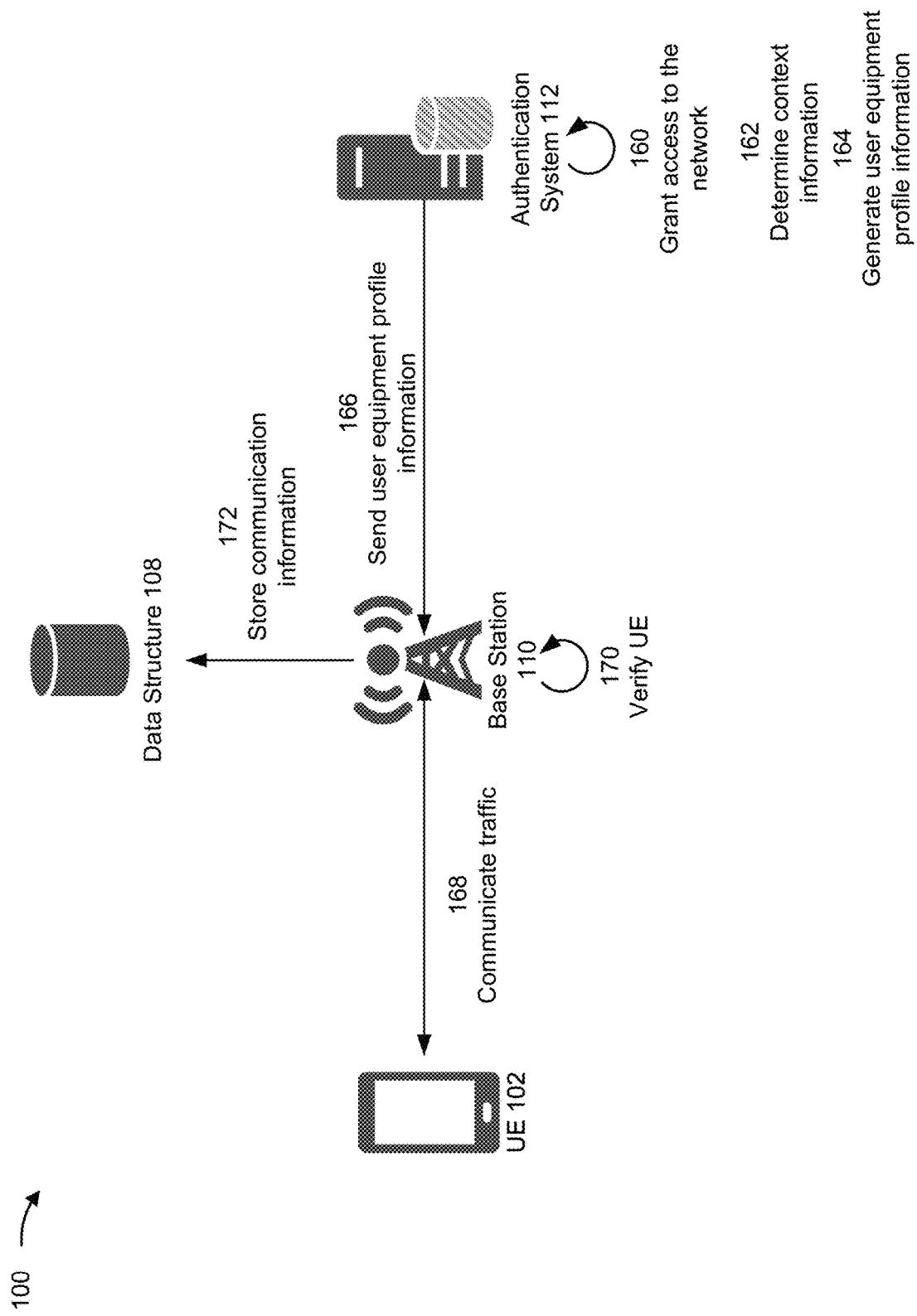

In some implementations, the authentication system 112 may grant or deny (e.g., as a result of the authentication process described above), the UE 102 access to the wireless communication network. For example, as shown in FIG. 1F, and by reference number 160, the authentication system 112 (e.g., based on authenticating the UE 102) may grant the UE 102 access to the wireless communication network (e.g., allow the UE 102 to join the wireless communication network and cause one or more services of the wireless communication network to be provided to the UE 102). Alternatively, the authentication system 112 (e.g., based on not authenticating the UE 102) may deny the UE 102 access to the wireless communication network (e.g., prevent all services of the wireless communication network from being provided to the UE 102).

As shown by reference number 162, the authentication system 112 may determine context information associated with the UE 102 (e.g., based on granting the UE 102 access to the wireless communication network). For example, the authentication system 112 may search a data structure (e.g., a database, a table, and/or an electronic file, among other examples, that stores UE context information and that is included in the authentication system 112 and/or accessible to the authentication system 112) for an entry that is associated with the UE 102 (e.g., based on the identifier associated with the UE 102 that is included in the request for access to the wireless communication network sent by the UE 102). The authentication system 112 may process the entry to obtain the context information associated with the UE 102. The context information may indicate, for example, one or more services of the wireless communication network that are available to the UE 102, such as a security capability service, a maximum bit rate service, a network slice service, and/or one or more other services that are available to the UE 102 (e.g., based on a subscription to the wireless communication network by the UE 102).

In some implementations, as shown by reference number 164, the authentication system 112 may generate user equipment profile information. The user equipment profile information may include, for example, the baseline RF response profile (e.g., that indicates one or more baseline RF responses of the user equipment) and/or the context information. In some implementations, the authentication system 112 may process the context information to identify the one or more services of the wireless communication network that are available to the UE 102 and may process, using a hashing technique (e.g., with some or all of the baseline RF response profile as a hash seed value), information identifying the one or more services to generate respective hash values of the one or more services. Accordingly, the authentication system 112 may include the respective hash values of the one or more services in the user equipment profile information (e.g., instead of the context information). In this way, the user equipment profile information may include information (e.g., subscriber profile identification (SPID) information) that identifies the UE 102 and the one or more services of the wireless communication network that are available to the UE 102.

In some implementations, the authentication system 112 may compare the respective hash values of the one or more services of the wireless communication network that are available to the UE 102 and the respective hash values of the one or more supported services of the UE 102 (e.g., that are included in the baseline RF response information). Accordingly, the authentication system 112 may identify a set of hash values of the one or more services of the wireless communication network that are available to the UE 102 that match (e.g., that are equal to) a set of hash values of the one or more supported services of the UE 102, and may include the set of hash values of the one or more services of the wireless communication network that are available to the UE 102 in the user equipment profile information (e.g., include hash values of services of the wireless communication network that are available to the UE 102 and that are supported by the UE 102). Moreover, the authentication system 112 may not include any hash value associated with the one or more other services of the wireless communication network that are available to the UE 102 in the user equipment profile information (e.g., because the one or more other services are not supported by the UE 102).

In some implementations, the authentication system 112 may update the data structure that stores the UE context information. For example, the authentication system 112 may update the entry that is associated with the UE 102 to include the user equipment profile information. In this way, the entry may be updated to include identification information that is based just on the baseline RF response profile of the UE 102 and not an identifier that was assigned to the UE 102.

As further shown in FIG. 1F, and by reference number 166, the authentication system 112 may send the user equipment profile information to the base station 110. As shown by reference number 168, the base station 110 may communicate traffic with the UE 102 (e.g., based on the user equipment profile information). For example, the base station 110 may communicate with the UE 102 to allow the UE 102 access to the wireless communication network. In some implementations, the base station 110 may provide, to the UE 102, the one or more services of the wireless communication network that are available to the UE 102 (e.g., as indicated by the user equipment profile information). For example, the base station 110 may process (e.g., parse or read) the user equipment profile information to identify the baseline RF response profile and may process, using a hashing technique (e.g., with some or all of the baseline RF response profile as a hash seed value), information identifying one or more services supported by the base station 110 to generate respective hash values of the one or more services. The base station 110 may compare the respective hash values of the one or more services supported by the base station 110 and the respective hash values of the one or more services identified in the user equipment profile information to determine which services to provide to the UE 102.

In some implementations, as shown by reference number 170, the authentication system 112 may verify the UE 102. For example, the authentication system 112 may obtain additional dynamic RF response information associated with the UE 102 (e.g., in a similar manner as that described herein in relation to FIG. 1E) and may verify, based on the additional dynamic RF response information and the user equipment profile information (e.g., the baseline RF response profile included in the user equipment profile information), the UE 102 (e.g., by determining that the baseline RF response profile and the additional dynamic RF response information match). Accordingly, the base station 110 may provide, to the UE 102 and based on verifying the user equipment, the one or more other services of the wireless communication network that are available to the UE 102 that are indicated in the user equipment profile information.

As further shown in FIG. 1F, and by reference number 172, the base station 110 may store communication information associated with the base station 110 communicating with the UE 102. For example, the base station 110 may communicate with the data structure 108 to cause the data structure 108 to update the at least one entry associated with the UE 102 (e.g., as described above in relation to FIG. 1A) and cause the at least one entry to include the communication information. The communication information may include, for example, a time of communication, a type of communication, an identifier of a service provided, and/or other information. In some implementations, the data structure may generate at least one new entry to include the communication information that is indexed by some or all of the user equipment profile information (e.g., indexed by the baseline RF response profile). In this way, the at least one new entry may be incomprehensible to any device that does not have access to the user equipment profile information.

As indicated above, FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of one or more examples 100 may perform one or more functions described as being performed by another set of devices of one or more examples 100.

Figure 2:
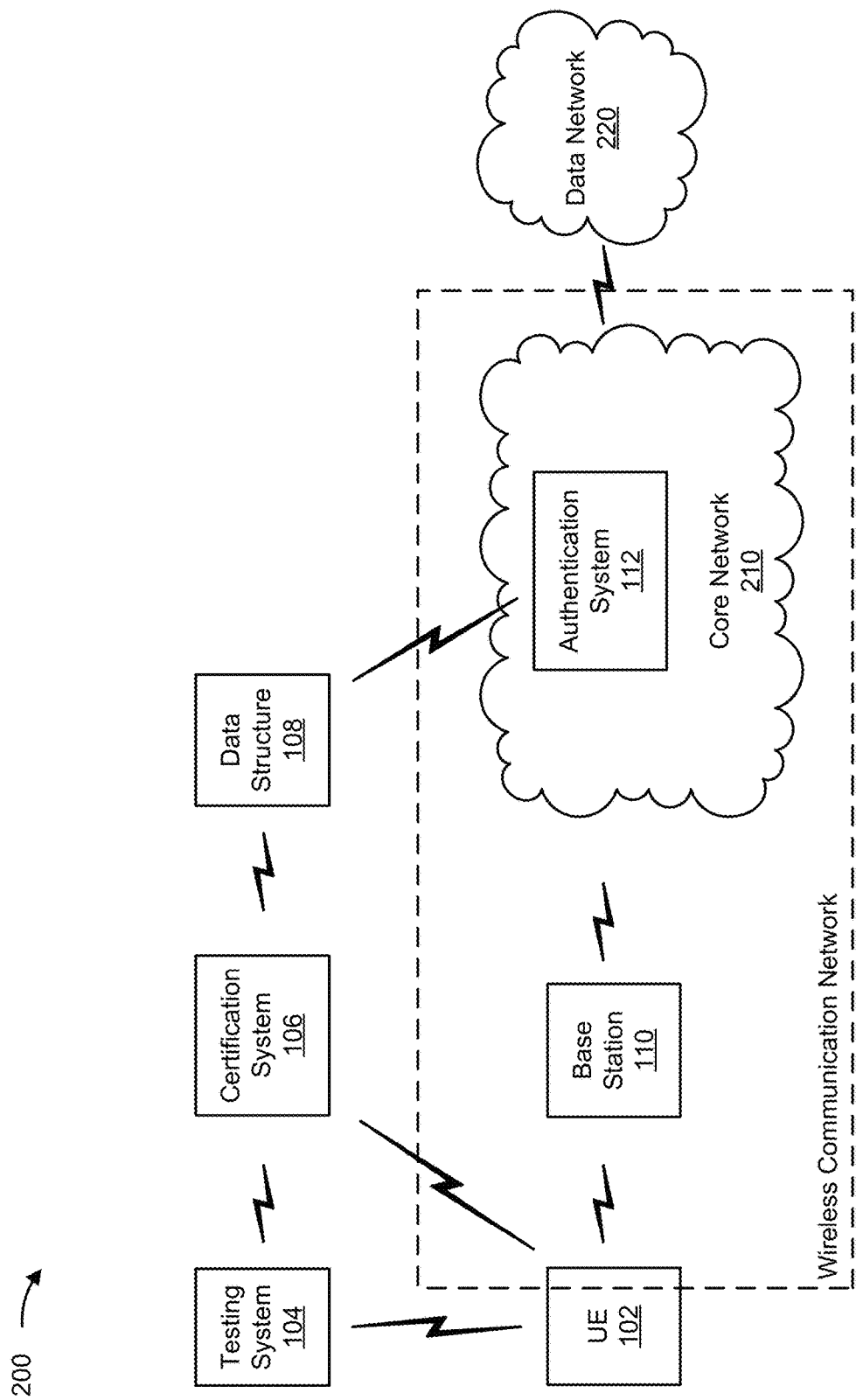
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the UE 102, the testing system 104, the certification system 106, the data structure 108, the base station 110, the authentication system 112, a core network 210, and/or a data network 220. Devices of environment 200 may interconnect via wired connections, wireless connections, or a combination of wired and wireless connections.

The UE 102 includes one or more devices capable of receiving, generating, storing, processing, and/or providing information, as described elsewhere herein. The UE 102 may include a communication device and/or a computing device. For example, the UE 102 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the UE 102 may include an Internet of things (IoT) UE, such as a narrowband IoT (NB-IoT) UE, an IIoT UE, and/or another type of IoT UE. For example, the UE 102 may include one or more sensors (e.g., to measure one or more attributes associated with the UE 102), one or more cameras, one or more robots, one or more drones, one or more industrial machines, one or more smart machines, among other examples. In some implementations, the UE 102 may include one or more devices capable of communicating with the base station 110, the authentication system 112, and/or the data network 220 (e.g., via the core network 210). For example, the UE 102 may include a wireless communication device, a radiotelephone, a personal communications system (PCS) terminal (e.g., that can combine a cellular radiotelephone with data processing and data communications capabilities), a smart phone, a laptop computer, a tablet computer, an autonomous vehicle, and/or a similar device. In some implementations, the UE 102 may include a machine-type communication (MTC) UE, such as an evolved or enhanced MTC (eMTC) UE.

The testing system 104 includes one or more devices capable of receiving, generating, storing, processing, providing, and/or routing information (e.g., baseline RF response information), as described elsewhere herein. The testing system 104 may include a communication device and/or a computing device. For example, the testing system 104 may include a server, such as an application server, a client server, a web server, a database server, a host server, a proxy server, a virtual server (e.g., executing on computing hardware), or a server in a cloud computing system. In some implementations, the testing system 104 includes computing hardware used in a cloud computing environment.

The certification system 106 includes one or more devices capable of receiving, generating, storing, processing, providing, and/or routing information (e.g., authentication information), as described elsewhere herein. The certification system may be associated with a certification authority. The certification system 106 may include a communication device and/or a computing device. For example, the certification system 106 may include a server, such as an application server, a client server, a web server, a database server, a host server, a proxy server, a virtual server (e.g., executing on computing hardware), or a server in a cloud computing system. In some implementations, the certification system 106 includes computing hardware used in a cloud computing environment.

The data structure 108 includes one or more devices capable of receiving, generating, storing, processing, and/or providing information (e.g., baseline RF response information), as described elsewhere herein. The data structure 108 may include a communication device and/or a computing device. For example, the data structure 108 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the data structure 108 is a distributed ledger, such as a blockchain.

The base station 110 includes one or more devices capable of receiving, generating, storing, processing, and/or providing information, as described elsewhere herein. In some implementations, the base station 110 may be associated with a wireless communication network and may include one or more devices capable of communicating with the UE 102 using a cellular radio access technology (RAT). For example, the base station 110 may include a base transceiver station, a radio base station, a node B, an evolved node B (eNB), a next generation node B (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, the base station 110 may transfer traffic between the UE 102 (e.g., using a cellular RAT) and the core network 210.

In some implementations, the base station 110 may provide communication transmission signals (e.g., mmWave transmission signals) to the UE 102 (e.g., to facilitate communication with the core network 210). The base station 110 may be configured to capture dynamic RF response information associated with the UE 102 that is provided by the UE 102 to the base station 110 and to send the dynamic RF response information to the authentication system 112.

The authentication system 112 includes one or more devices capable of receiving, generating, storing, processing, providing, and/or routing information, as described elsewhere herein. The authentication system 112 may include a communication device and/or a computing device. For example, the authentication system 112 may include a server, such as an application server, a client server, a web server, a database server, a host server, a proxy server, a virtual server (e.g., executing on computing hardware), or a server in a cloud computing system. In some implementations, the authentication system 112 includes computing hardware used in a cloud computing environment. The authentication system 112 may be configured to obtain baseline RF response information associated with the UE 102 and dynamic information associated with the UE 102 to determine whether to grant or deny the UE 102 access to the wireless communication network. In some implementations, the authentication system 112 may be included in core network 210. For example, the authentication system 112 may include a home subscriber server (HSS), a mobility management entity (MME), an access and mobility management function (AMF), an access and mobility management function (AMF), a session management function (SMF), and/or one or more other functions of the core network 210.

The core network 210 includes various types of core network architectures, such as a 5G Next Generation (NG) Core, a Long-Term Evolution (LTE) Evolved Packet Core (EPC), and/or the like. In some implementations, the core network 210 may be implemented on physical devices, such as a gateway, a mobility management entity, and/or the like. In some implementations, the hardware and/or software implementing the core network 210 may be virtualized (e.g., through the use of network function virtualization and/or software-defined networking), thereby allowing for the use of composable infrastructure when implementing the core network 210. In this way, networking, storage, and compute resources can be allocated to implement the functions of the core network 210 in a flexible manner as opposed to relying on dedicated hardware and software to implement these functions.

The data network 220 includes one or more wired and/or wireless networks. For example, the data network 220 may include a cellular network (e.g., a 5G network, a 4G network, a LTE network, a third generation (3G) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
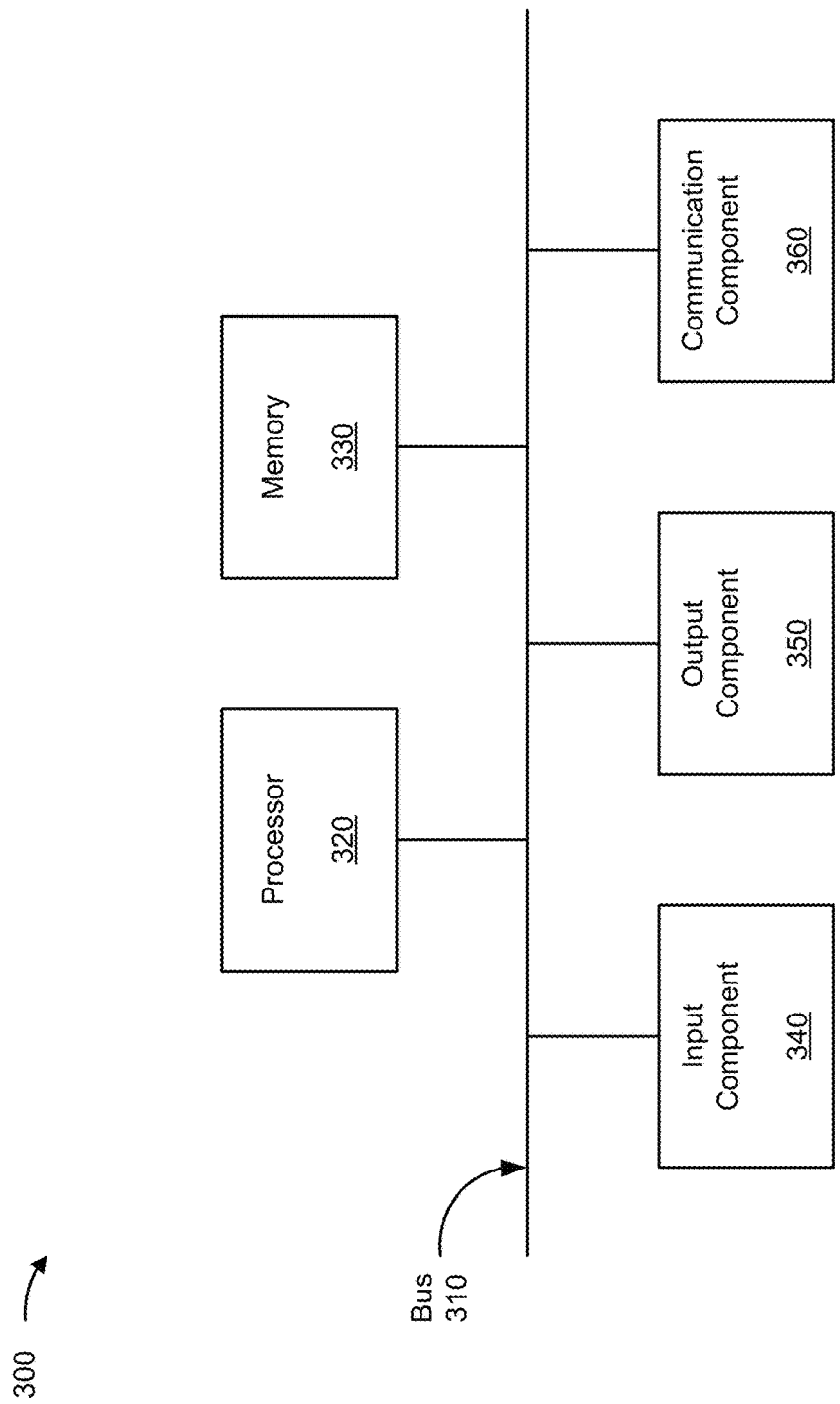
FIG. 3 is a diagram of example components of one or more devices of FIG. 2.

FIG. 3 is a diagram of example components of a device 300, which may correspond to the UE 102, the testing system 104, the certification system 106, the data structure 108, the base station 110, and/or the authentication system 112. In some implementations, the UE 102, the testing system 104, the certification system 106, the data structure 108, the base station 110, and/or the authentication system 112 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
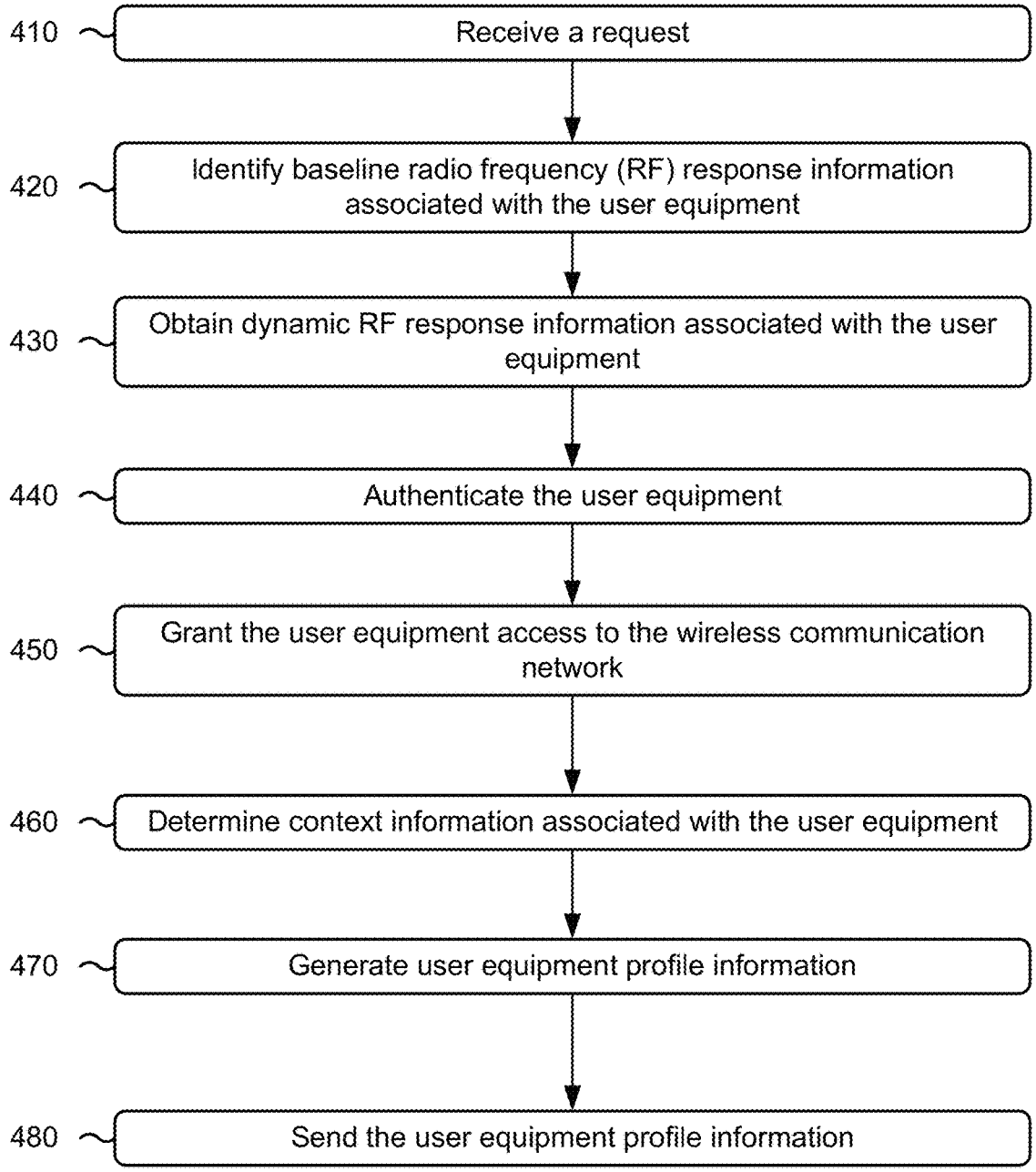
FIG. 4 is a flowchart of an example process relating to providing access to a wireless communication network based on radio frequency response information and context information.

FIG. 4 is a flowchart of an example process 400 associated with providing access to a wireless communication network based on radio frequency response information and context information. In some implementations, one or more process blocks of FIG. 4 may be performed by a system (e.g., authentication system 112). In some implementations, one or more process blocks of FIG. 4 may be performed by another device or a group of devices separate from or including the system, such as a user equipment (e.g., UE 102), a testing system (e.g., testing system 104), a certification system (e.g., certification system 106), a data structure (e.g., data structure 108), and/or a base station (e.g., base station 110). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a request (block 410). For example, the system may receive, from a user equipment, a request for access to a wireless communication network, as described above.

As further shown in FIG. 4, process 400 may include identifying baseline radio frequency (RF) response information associated with user equipment (block 420). For example, the system may identify, based on the request, baseline RF response information associated with the user equipment, as described above. In some implementations, the baseline RF response information includes a baseline RF response profile that indicates one or more baseline RF responses of the user equipment, and hashing information that indicates one or more hash values respectively associated with one or more services supported by the user equipment. Identifying the baseline RF response information may include obtaining, from the user equipment and based on the request, an authentication certificate, wherein the authentication certificate includes the baseline RF response information, authenticating the authentication certificate, and processing the authentication certificate to identify the baseline RF response information. Alternatively, identifying the baseline RF response information may include processing the request to identify an identifier associated with the user equipment; searching, based on the identifier, a data structure to identify at least one entry associated with the user equipment; and processing the at least one entry to obtain the baseline RF response information.

As further shown in FIG. 4, process 400 may include obtaining dynamic RF response information associated with the user equipment (block 430). For example, the system may obtain dynamic RF response information associated with the user equipment, as described above.

As further shown in FIG. 4, process 400 may include authenticating the user equipment (block 440). For example, the system may authenticate, based on the dynamic RF response information and the baseline RF response information, the user equipment, as described above. In some implementations, authenticating the user equipment includes identifying a baseline RF response profile included in the baseline RF response information, determining, based on comparing the baseline RF response profile and the dynamic RF response information, that the baseline RF response profile matches the dynamic RF response information, and authenticating, based on determining that the baseline RF response profile matches the dynamic RF response information, the user equipment. In some implementations, authenticating the user equipment includes identifying a baseline RF response profile included in the baseline RF response information, determining that a particular baseline RF response indicated by the baseline RF response profile matches a particular RF response indicated by the dynamic RF response information, and authenticating, based on determining that the particular baseline RF response matches the particular RF response, the user equipment.

As further shown in FIG. 4, process 400 may include granting the user equipment access to the wireless communication network (block 450). For example, the system may grant, based on authenticating the user equipment, the user equipment access to the wireless communication network, as described above. Granting the user equipment access to the wireless communication network causes one or more services of the wireless communication network to be provided to the user equipment. Alternatively, the system may deny the user equipment access to the wireless communication network (e.g., based on not authenticating the user equipment). Denying the user equipment access to the wireless communication network prevents all services of the wireless communication network from being provided to the user equipment.

As further shown in FIG. 4, process 400 may include determining context information associated with the user equipment (block 460). For example, the system may determine, based on granting the user equipment access to the wireless communication network, context information associated with the user equipment, as described above. The context information may indicate one or more services of the wireless communication network that are available to the user equipment. In some implementations, determining the context information includes processing the request to identify an identifier associated with the user equipment, searching, based on the identifier, a data structure to identify at least one entry associated with the user equipment, and processing the at least one entry to obtain the context information.

As further shown in FIG. 4, process 400 may include generating user equipment profile information (block 470). For example, the system may generate, based on the baseline RF response information and the context information, user equipment profile information, as described above. In some implementations, generating the user equipment profile information includes processing the baseline RF response information to identify a baseline RF response profile that indicates one or more baseline RF responses of the user equipment, processing the context information to identify one or more services of the wireless communication network that are available to the user equipment, processing, using a hashing technique and based on the baseline RF response profile, information identifying the one or more services to generate respective hash values of the one or more services, and generating the user equipment profile information to include the baseline RF response profile and the respective hash values of the one or more services.

As further shown in FIG. 4, process 400 may include sending the user equipment profile information (block 480). For example, the system may send, to a base station associated with the wireless communication network, the user equipment profile information to facilitate access to the wireless communication network by the user equipment, as described above. In some implementations, the base station, based on receiving the user equipment profile information, may provide, to the user equipment, one or more services of the wireless communication network that are indicated by the context information. Additionally, the base station may store, in a data structure, communication information associated with providing the one or more services to the user equipment. In some implementations, the base station obtains additional dynamic RF response information associated with the user equipment; verifies, based on the additional dynamic RF response information and the user equipment profile information, the user equipment; and provides, to the user equipment and based on verifying the user equipment, one or more services of the wireless communication network that are indicated by the user equipment profile information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system, comprising:
   one or more processors configured to:
      receive, from a user equipment, a request for access to a wireless communication network;
      identify, based on the request, baseline radio frequency (RF) response information associated with the user equipment;
      obtain dynamic RF response information associated with the user equipment;
      authenticate, based on the dynamic RF response information and the baseline RF response information, the user equipment;
      grant, based on authenticating the user equipment, the user equipment access to the wireless communication network;
      determine, based on granting the user equipment access to the wireless communication network, context information associated with the user equipment;
      generate, based on the baseline RF response information and based on processing the context information using a hashing technique, user equipment profile information that includes a hash value associated with the wireless communication network; and
      send, to a base station associated with the wireless communication network, the user equipment profile information to facilitate access to the wireless communication network by the user equipment.

2. The system of claim 1, wherein the baseline RF response information includes:
   a baseline RF response profile that indicates one or more baseline RF responses of the user equipment; and
   hash information that indicates one or more hash values respectively associated with one or more services supported by the user equipment.

3. The system of claim 1, wherein the one or more processors, to identify the baseline RF response information, are configured to:
   obtain, from the user equipment and based on the request, an authentication certificate, wherein the authentication certificate includes the baseline RF response information;
   authenticate the authentication certificate; and
   process the authentication certificate to identify the baseline RF response information.

4. The system of claim 1, wherein the one or more processors, to authenticate the user equipment, are configured to:
   identify a baseline RF response profile included in the baseline RF response information;
   determine, based on comparing the baseline RF response profile and the dynamic RF response information, that the baseline RF response profile matches the dynamic RF response information; and
   authenticate, based on determining that the baseline RF response profile matches the dynamic RF response information, the user equipment.

5. The system of claim 1, wherein the one or more processors, to determine the context information, are configured to:
   process the request to identify an identifier associated with the user equipment;
   search, based on the identifier, a data structure to identify at least one entry associated with the user equipment; and
   process the at least one entry to obtain the context information.

6. The system of claim 1, wherein the context information indicates one or more services of the wireless communication network that are available to the user equipment.

7. The system of claim 1, wherein the one or more processors, to generate the user equipment profile information, are configured to:
process the baseline RF response information to identify a baseline RF response profile that indicates one or more baseline RF responses of the user equipment;
process the context information to identify one or more services of the wireless communication network that are available to the user equipment;
identify the one or more services to generate respective hash values of the one or more services; and
generate the user equipment profile information to include the baseline RF response profile and the respective hash values of the one or more services.

8. The system of claim 1, wherein the base station, based on receiving the user equipment profile information, is configured to:
provide, to the user equipment, one or more services of the wireless communication network that are indicated by the context information.

9. The system of claim 8, wherein the base station, based on receiving the user equipment profile information, is configured to:
store, in a data structure, communication information associated with providing the one or more services to the user equipment.

10. A non-transitory computer-readable medium storing a set of instructions, the set of instructions comprising:
one or more instructions that, when executed by one or more processors of a system, cause the system to:
receive, from a user equipment, a request for access to a wireless communication network;
identify, based on the request, baseline radio frequency (RF) response information associated with the user equipment;
obtain dynamic RF response information associated with the user equipment,
wherein the dynamic RF response information includes data that indicates a respective RF response of the user equipment at one or more instants of time within a time period;
cause an authentication process to be performed on the dynamic RF response information and the baseline RF response information; and
grant or deny, based on a result of the authentication process, the user equipment access to the wireless communication network.

11. The non-transitory computer-readable medium of claim 10, wherein the one or more instructions, that cause the system to identify the baseline RF response information, cause the system to:
obtain, from the user equipment and based on the request, an authentication certificate; and
process the authentication certificate to identify the baseline RF response information.

12. The non-transitory computer-readable medium of claim 10, wherein the one or more instructions, that cause the system to identify the baseline RF response information, cause the system to:
process the request to identify an identifier associated with the user equipment;
search, based on the identifier, a data structure to identify at least one entry associated with the user equipment; and
process the at least one entry to obtain the baseline RF response information.

13. The non-transitory computer-readable medium of claim 10, wherein the one or more instructions, that cause the system to cause the authentication process to be performed, cause the system to:
identify a baseline RF response profile included in the baseline RF response information;
determine that a particular baseline RF response indicated by the baseline RF response profile matches a particular RF response indicated by the dynamic RF response information; and
authenticate, based on determining that the particular baseline RF response matches the particular RF response, the user equipment.

14. The non-transitory computer-readable medium of claim 10, wherein granting the user equipment access to the wireless communication network causes one or more services of the wireless communication network to be provided to the user equipment.

15. The non-transitory computer-readable medium of claim 10, wherein denying the user equipment access to the wireless communication network prevents all services of the wireless communication network from being provided to the user equipment.

16. A method, comprising:
obtaining, by a system, dynamic radio frequency (RF) response information associated with a user equipment and baseline RF response information associated with the user equipment;
authenticating, by the system, based on the dynamic RF response information and the baseline RF response information, the user equipment;
granting, by the system and based on authenticating the user equipment, the user equipment access to a wireless communication network;
determining, by the system and based on granting access to the wireless communication network, context information associated with the user equipment;
generating, by the system, based on the baseline RF response information, and based on processing the context information using a hashing technique, user equipment profile information that includes a hash value associated with the wireless communication network; and
sending, by the system, to a base station associated with the wireless communication network, the user equipment profile information.

17. The method of claim 16, wherein generating the user equipment profile information comprises:
processing the baseline RF response information to identify a baseline RF response profile that indicates one or more baseline RF responses of the user equipment;
processing, based on the baseline RF response profile, the context information to generate respective hash values of one or more services of the wireless communication network that are available to the user equipment; and
generating the user equipment profile information to include the baseline RF response profile and the respective hash values of the one or more services.

18. The method of claim 16, wherein the context information indicates one or more services of the wireless communication network that are available to the user equipment.

19. The method of claim 16, wherein the base station, based on receiving the user equipment profile information, is configured to:
- provide, to the user equipment, one or more services of the wireless communication network that are indicated by the context information; and
- store, in a data structure, communication information associated with providing the one or more services to the user equipment.

20. The method of claim 16, wherein the base station, based on receiving the user equipment profile information, is configured to:
- obtain additional dynamic RF response information associated with the user equipment;
- verify, based on the additional dynamic RF response information and the user equipment profile information, the user equipment; and
- provide, to the user equipment and based on verifying the user equipment, one or more services of the wireless communication network that are indicated by the user equipment profile information.

* * * * *